(12) United States Patent
Fukuda et al.

(10) Patent No.: US 10,274,963 B2
(45) Date of Patent: Apr. 30, 2019

(54) WORK VEHICLE

(71) Applicant: YANMAR CO., LTD., Osaka-shi, Osaka (JP)

(72) Inventors: Toshio Fukuda, Nagoya (JP); Kosuke Sekiyama, Nagoya (JP); Yasuhisa Hasegawa, Nagoya (JP); Tomoya Fukukawa, Nagoya (JP); Toshifumi Hiramatsu, Osaka (JP)

(73) Assignee: YANMAR CO., LTD., Osaka (JP)

( * ) Notice: Subject to any disclaimer, the term of this patent is extended or adjusted under 35 U.S.C. 154(b) by 90 days.

(21) Appl. No.: 15/534,617

(22) PCT Filed: Dec. 10, 2015

(86) PCT No.: PCT/JP2015/084652
§ 371 (c)(1),
(2) Date: Jun. 9, 2017

(87) PCT Pub. No.: WO2016/093311
PCT Pub. Date: Jun. 16, 2016

(65) Prior Publication Data
US 2017/0322559 A1 Nov. 9, 2017

(30) Foreign Application Priority Data
Dec. 11, 2014 (JP) .................................. 2014-250953

(51) Int. Cl.
*G05D 1/00* (2006.01)
*G05D 1/02* (2006.01)
(Continued)

(52) U.S. Cl.
CPC ........... *G05D 1/0219* (2013.01); *A01B 69/00* (2013.01); *A01B 69/008* (2013.01);
(Continued)

(58) Field of Classification Search
CPC .. G05D 1/0219; G05D 1/0278; G05D 1/0274; G05D 1/0246; G05D 1/0088;
(Continued)

(56) References Cited

U.S. PATENT DOCUMENTS 4,211,921 A * 7/1980 Kanetou ............... G06K 11/02
172/26
6,336,051 B1 * 1/2002 Pangels ............... A01B 79/005
700/207
(Continued)

FOREIGN PATENT DOCUMENTS

| JP | 7-59407 A | 3/1995 |
|---|---|---|
| JP | 10-307627 A | 11/1998 |
| JP | 2010-225126 A | 10/2010 |

OTHER PUBLICATIONS

International Search Report, issued in PCT/JP2015/084652 (PCT/ISA/210), dated Jan. 19, 2016.

*Primary Examiner* — Thomas Ingram
(74) *Attorney, Agent, or Firm* — Norton Rose Fulbright US LLP

(57) ABSTRACT

A mowing vehicle provided with a traveling machine and a mowing device includes a first image-capturing device and a controlling unit configured to control the traveling machine to travel autonomously along a boundary line of grass before and after mowing formed by the mowing device. The controlling unit includes a boundary-detecting unit configured to detect the boundary line and a traveling-controlling unit configured to control traveling directions of the traveling machine. The boundary-detecting unit is configured to generate intensity distribution information regarding texture information in a predetermined direction by filtering with a Gabor filter on a captured image. The boundary-detecting unit is configured to carry out statistical processing on the intensity distribution information per
(Continued)

inspection area divided in plural in a vertical direction so as to detect boundary points and to detect the boundary line from the boundary points per the inspection area.

5 Claims, 11 Drawing Sheets

(51) Int. Cl.
    *A01B 69/00*     (2006.01)
    *A01B 69/04*     (2006.01)
    *A01D 34/00*     (2006.01)
    *A01D 34/66*     (2006.01)
    *A01D 34/71*     (2006.01)
    *A01D 34/74*     (2006.01)
    *A01D 69/02*     (2006.01)
    *A01D 101/00*     (2006.01)

(52) U.S. Cl.
    CPC .......... *A01D 34/008* (2013.01); *G05D 1/0088* (2013.01); *G05D 1/02* (2013.01); *G05D 1/0246* (2013.01); *G05D 1/0274* (2013.01); *G05D 1/0278* (2013.01); *A01D 34/66* (2013.01); *A01D 34/71* (2013.01); *A01D 34/74* (2013.01); *A01D 69/02* (2013.01); *A01D 2101/00* (2013.01); *G05D 2201/0208* (2013.01)

(58) Field of Classification Search
    CPC .............. G05D 1/02; G05D 2201/0208; A01B 69/008; A01B 69/00; A01D 34/008; A01D 2101/00; A01D 69/02; A01D 34/74; A01D 34/71; A01D 34/66
    See application file for complete search history.

(56) References Cited

U.S. PATENT DOCUMENTS

| | | | |
|---|---|---|---|
| 6,819,780 B2* | 11/2004 | Benson | A01B 69/001 180/8.3 |
| 9,516,806 B2* | 12/2016 | Yamauchi | G05D 1/0236 |
| 2018/0125003 A1* | 5/2018 | Wu | A01D 34/00 |

* cited by examiner

WORK VEHICLE

TECHNICAL FIELD

The present invention relates to a work vehicle provided with a traveling machine and a working machine and configured to work while traveling. More specifically, the present invention relates to a work vehicle configured to travel autonomously along a boundary line showing traces of work.

BACKGROUND ART

In recent years, the following work vehicle has been proposed in a field of a work vehicle configured to carry out various operations while running a traveling machine for purpose of improving work efficiency and reducing workload. That is, a work vehicle configured to carry out various operations by unmanned traveling or by so-called autonomous traveling without a driver getting on board.

Examples of such a work vehicle include one that autonomously travels using a global navigation satellite system (GNSS), one that autonomously travels using sensors such as a physically contact sensor and optical sensor, and one that autonomously travels using images captured by an image-capturing device.

For example, Patent Literature 1 discloses a traveling-controlling device for an autonomously-traveling work vehicle, as an example of a device included in the work vehicle configured to use images to travel autonomously. The traveling-controlling device herein is configured to control a work vehicle to travel along a working boundary between a worked area and non-worked area. With respect to distance images obtained by processing images captured by a stereoscopic camera mounted on the vehicle, a unit included in the traveling-controlling device is configured to detect a distance step due to the working boundary based on changes in differential value obtained by differentiating distance data. The traveling-controlling device also includes a unit configured to calculate a straight line approximating the working boundary based on detection points of the distance step. Furthermore, the traveling-controlling device includes a unit configured to correct orientation of the vehicle based on the data of the straight line approximating the working boundary and to control a steering system so as to travel along the working boundary.

CITATION LIST

Patent Literature

Patent Literature 1: JP H10-307627 A

SUMMARY OF INVENTION

Technical Problem

According to a technique disclosed in Patent Literature 1, it is possible to accurately detect a working boundary between a working area and a non-working area and to secure parallelism in reciprocating straight traveling which requires parallelism so as to avoid meander and to achieve accurate traveling along the working boundary.

In the technique disclosed in Patent Literature 1, the working boundary is detected based on distance images obtained by processing images captured by a stereoscopic camera. Herein, information volumes of the obtained images are so large that arithmetic load of a traveling-controlling device is tend to increase. In regard to the stereoscopic camera configured to capture an identical subject from different directions with respect to a light source, it is difficult to calibrate the camera and there are many restrictions on where to provide the camera. Therefore, manufacturing costs increase.

An object of the present invention is to provide a work vehicle with a simple structure configured to accurately detect a boundary line showing traces of work and to autonomously travel along the boundary line.

Solution to Problem

In order to solve the problems mentioned above, a work vehicle according to an embodiment of the present invention is configured to work while traveling, provided with a traveling machine and a working machine, including:

a first image-capturing device configured to capture peripheries of the traveling machine; and a controlling unit configured to control the traveling machine to travel autonomously along a boundary line showing traces of work consecutively formed by the working machine, wherein the controlling unit includes a boundary-detecting unit configured to detect the boundary line by processing an image captured by the first image-capturing devices, and a traveling-controlling unit configured to control traveling directions of the traveling machine so as to be along the boundary line detected by the boundary-detecting unit, wherein the boundary-detecting unit is configured to generate intensity distribution information regarding texture information in a predetermined direction by filtering with a Gabor filter on the image captured by the first image-capturing device, carry out statistical processing on the intensity distribution information per inspection area divided in plural in a vertical direction so as to detect boundary points, and detect the boundary line from the boundary points per the inspection area.

The predetermined direction may be an upward direction or a downward direction.

The first image-capturing device may be disposed in such a manner that the boundary line showing the traces of work is placed substantially at the center in the horizontal direction of the image to be captured.

The work vehicle may include first image-capturing devices provided corresponding to each of right-and-left edges of the working machine.

In this configuration, the controlling unit may be configured to carry out processing on an image captured by one of the first image-capturing devices.

The work vehicle may further include a memory unit and a second image-capturing device capable of capturing the traces of work right after the work of the working machine.

In this configuration, the controlling unit may be configured to generate another intensity distribution information regarding texture information in a predetermined direction by the filtering with the Gabor filter on an image captured by the second image-capturing device.

Furthermore, in the configuration above, the controlling unit then may store in the memory unit processing results obtained by carrying out statistical processing on aforementioned another intensity distribution information per inspection area divided in plural in a vertical direction.

Furthermore, in the configuration above, the controlling unit may later use the processing results stored in the memory unit when carrying out the statistical processing in which the image captured by the first image-capturing device is processed so as to detect the boundary line.

Advantageous Effects of Invention

A work vehicle of an embodiment of the present invention is configured to work while traveling, provided with a traveling machine and a working machine, including: a first image-capturing device configured to capture peripheries of the traveling machine; and a controlling unit configured to control the traveling machine to travel autonomously along a boundary line showing traces of work consecutively formed by the working machine. The controlling unit includes a boundary-detecting unit configured to detect the boundary line by processing an image captured by the first image-capturing device and includes a traveling-controlling unit configured to control traveling directions of the traveling machine so as to be along the boundary line detected by the boundary-detecting unit. The boundary-detecting unit is configured to generate intensity distribution information regarding texture information in a predetermined direction by filtering with a Gabor filter on the image captured by the first image-capturing device and to carry out statistical processing on the intensity distribution information per inspection area divided in plural in a vertical direction so as to detect boundary points and to detect the boundary line from the boundary points per inspection area. Therefore, according to the work vehicle of an embodiment of the present invention, it is possible to reduce an increase in arithmetic volume of the controlling unit and to accurately detect the boundary line showing the traces of work with a simple structure so that it is possible to accurately and autonomously travel along the boundary line.

Furthermore, according to the work vehicle of an embodiment of the present invention, the predetermined direction may be an upward direction or a downward direction. Therefore, in regard to the working machine configured to form the traces of work with changeable features in the vertical direction, it is possible to accurately detect the boundary line showing the traces of work.

Still further, according to the work vehicle of an embodiment of the present invention, the first image-capturing device may be disposed in such a manner that the boundary line showing the traces of work is placed substantially at the center in the horizontal direction of the image to be captured. Therefore, the arithmetic volume of the controlling unit can be reduced.

The work vehicle of an embodiment of the present invention may include first image-capturing devices provided corresponding to each of right-and-left edges of the working machine. In this configuration, the controlling unit may be configured to carry out processing on an image captured by one of the first image-capturing devices. Therefore, it is possible to accurately detect the boundary line showing the traces of work and to reduce the arithmetic volume of the controlling unit.

The work vehicle of an embodiment of the present invention further may include a memory unit and a second image-capturing device capable of capturing the traces of work right after the work of the working machine. In this configuration, the controlling unit may be configured to generate another intensity distribution information regarding texture information in a predetermined direction by filtering with the Gabor filter on an image captured by the second image-capturing device. Furthermore, in the configuration above, the controlling unit then may store in the memory unit processing results obtained by carrying out statistical processing on aforementioned another intensity distribution information per inspection area divided in plural in a vertical direction. Furthermore, in the configuration above, the controlling unit may later use the processing results stored in the memory unit when carrying out the statistical processing in which the image captured by the first image-capturing device is processed so as to detect the boundary line. Therefore, according to the work vehicle of an embodiment of the present invention, it is possible to appropriately detect the boundary line showing the traces of work and to reduce the arithmetic volume of the controlling unit.

DESCRIPTION OF EMBODIMENTS

Figure 1:
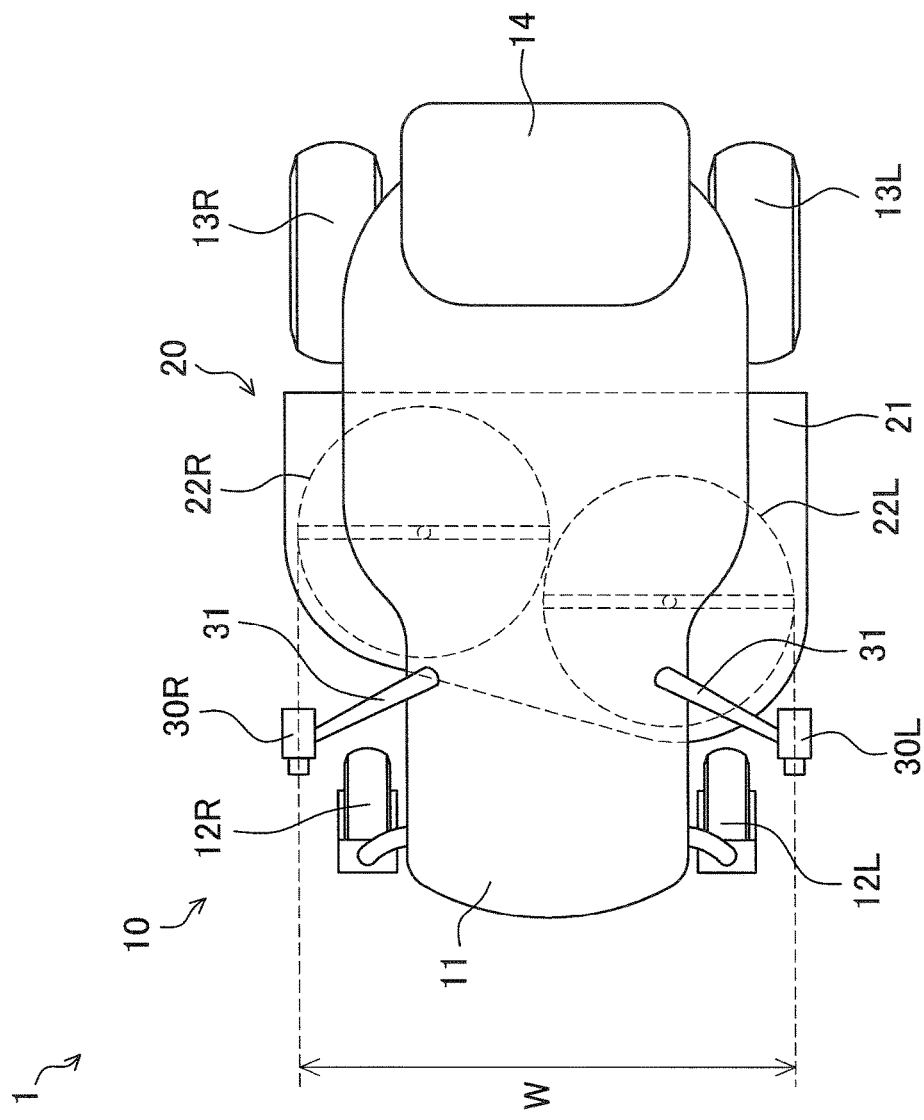
FIG. 1 is a schematic plane view illustrating an example of a work vehicle according to an embodiment of the present invention.

Embodiments for carrying out the present invention will be described in detail below with reference to the drawings. FIG. 1 is a plane view illustrating a mowing vehicle 1 as an example of a work vehicle according to the present embodiment. Hereinafter, for the sake of convenience for description, a left side in FIG. 1 being a forward direction of the mowing vehicle 1 will be referred to as an anterior direction, an upper side in FIG. 1 being perpendicular to the forward direction and horizontal will be referred to as a right direction, and a lower side in FIG. 1 will be referred to as a left direction.

The mowing vehicle 1 illustrated in FIG. 1 includes a traveling machine 10 and a mowing device 20 performing as a working machine. The traveling machine 10 includes front wheels 12 (12R, 12L) in both sides of a front part of a machine body 11, corresponding to the forward direction. The traveling machine 10 also includes rear wheels 13 (13R, 13L) in both sides of a back part. A detachable battery 14 is provided to the back part between the right-and-left rear wheels 13R, 13L. The front wheels 12 are coupled driving wheels, while the rear wheels 13 are driving wheels. The traveling machine 10 further includes unillustrated right-and-left traveling motors, right-and-left image-capturing devices 30 (30R, 30L), and the like. The right-and-left image-capturing devices 30 perform as first image-capturing devices capable of capturing the peripheries of the traveling machine 10. It should be noted that operations of the traveling motors, mowing device 20, and right-and-left image-capturing devices 30 are controlled by a controlling unit C which is not illustrated herein.

The right rear wheel 13R is interlocked and connected to the right traveling motor through unillustrated gears. The left rear wheel 13L is interlocked and connected to the left traveling motor through unillustrated gears. The right-and-left traveling motors can independently rotate the right-and-left rear wheels 13R, 13L which are the driving wheels. It should be noted that electric power of the traveling motors is supplied from the battery 14.

As the right-and-left traveling motors independently rotates the right-and-left rear wheels 13R, 13L, the mowing vehicle 1 can, for example, move backward and forward and turn around. In moving backward and forward, the right-and-left traveling motors rotate the right-and-left rear wheels 13R, 13L in the same direction and at the same speed. In turning around, the right-and-left traveling motors rotate the right rear wheel 13R and the left rear wheel 13L at different speed. Furthermore, by rotating the right rear wheel 13R and the left rear wheel 13L in opposite directions, the mowing vehicle 1 can turn pivotally.

It should be noted that the traveling machine 10 is not restricted to the structure mentioned above. For example, the traveling machine 10 may be provided with an engine as a prime mover and may travel by rotating the rear wheels 13 which are the driving wheels by the engine. Furthermore, the traveling machine 10 herein is steered by generating a difference in rotational speed between the right-and-left rear wheels. However, the traveling machine 10 may be steered by a steering device capable of changing orientation of the front wheels 12 with respect to the machine body 11.

The mowing device 20 is disposed between the front wheels 12 and rear wheels 13 and in a lower part of the machine body 11. The mowing device 20 is suspended in the lower part of the machine body 11 by an unillustrated suspending device. The mowing device 20 is movable in a vertical direction by the suspending device. The mowing vehicle 1 moves the mowing device 20 up and down so as to adjust lengths of grass to be mown.

The mowing device 20 includes, for example, a mower deck 21, unillustrated right-and-left mower motors, and right-and-left mower blades 22 (22R, 22L) for mowing grass. Side surface in a back part of the mower deck 21 is opened so that mown grass can be discharged backward. The right-and-left mower blades 22R, 22L are adjacently disposed inside the mower deck 21. The right mower blade 22R is rotated by the right mower motor and the left mower blade is rotated by the left mower motor. The right-and-left mower blades 22R, 22L are rotated so as to mow the grass. Electric power of the mower motors is supplied from the battery 14. Furthermore, operations of the mower motors are controlled by the controlling unit C. Accordingly, the mowing vehicle 1 can mow grass by the mowing device 20 while traveling. A mowing width W in a horizontal direction within which grass is mown by the mowing device 20 while traveling is a width between a right edge of a track of rotation at an end of the right mower blade 22R and a left edge of a track of rotation at an end of the left mower blade 22L. The mowing width W substantially equals to a width of the mower deck in the horizontal direction.

It should be noted that the mowing device 20 is not restricted to the structure mentioned above. For example, the traveling machine 10 may be provided with an engine as a prime mover and may rotate the mower blades 22 by the engine. Furthermore, disposition of the mowing device 20 with respect to the traveling machine 10, a shape of the mower deck 21, the number of the mower blades 22, and the like can be designed appropriately. For example, the mowing device 20 may be disposed in front of the traveling machine 10 or in back thereof. The mowing device 20 may discharge mown grass from the mower deck 21 in the horizontal direction.

An example of the image-capturing devices 30 (30R, 30L) is a charge coupled device (CCD) camera. Each of the right-and-left image-capturing devices 30R, 30L is attached to an end of each supporting bracket 31 extending laterally and upward from the machine body 11. The right-and-left image-capturing devices 30R, 30L are provided at angles of depression. The right-and-left image-capturing devices 30R, 30L can capture the ground in front of the traveling machine 10.

Herein, the right image-capturing device 30R is disposed in a part corresponding to a right edge of an operating unit of the mowing device 20, that is, the right edge of the track of rotation at the end of the right mower blade 22R. Therefore, the right image-capturing device 30R is disposed in a part corresponding to a right edge of an area with grass to be mown by the mowing device 20 while traveling. On the other hand, the left image-capturing device 30L is disposed in a part corresponding to a left edge of an operating unit of the mowing device 20, that is, the left edge of the track of rotation at the end of the left mower blade 22L. Therefore, the left image-capturing device 30L is disposed in a part corresponding to a left edge of an area with grass to be mown by the mowing device 20 while traveling. The controlling unit C processes an image captured by the image-capturing devices 30 so as to detect a boundary line showing traces of work consecutively formed by the mowing device 20, that is, a boundary line of grass before and after mowing. Note that, the image-capturing devices 30 are at least able to capture the peripheries of the traveling machine 10. It is possible to appropriately design where to dispose and how to attach the image-capturing devices 30.

Figure 2:
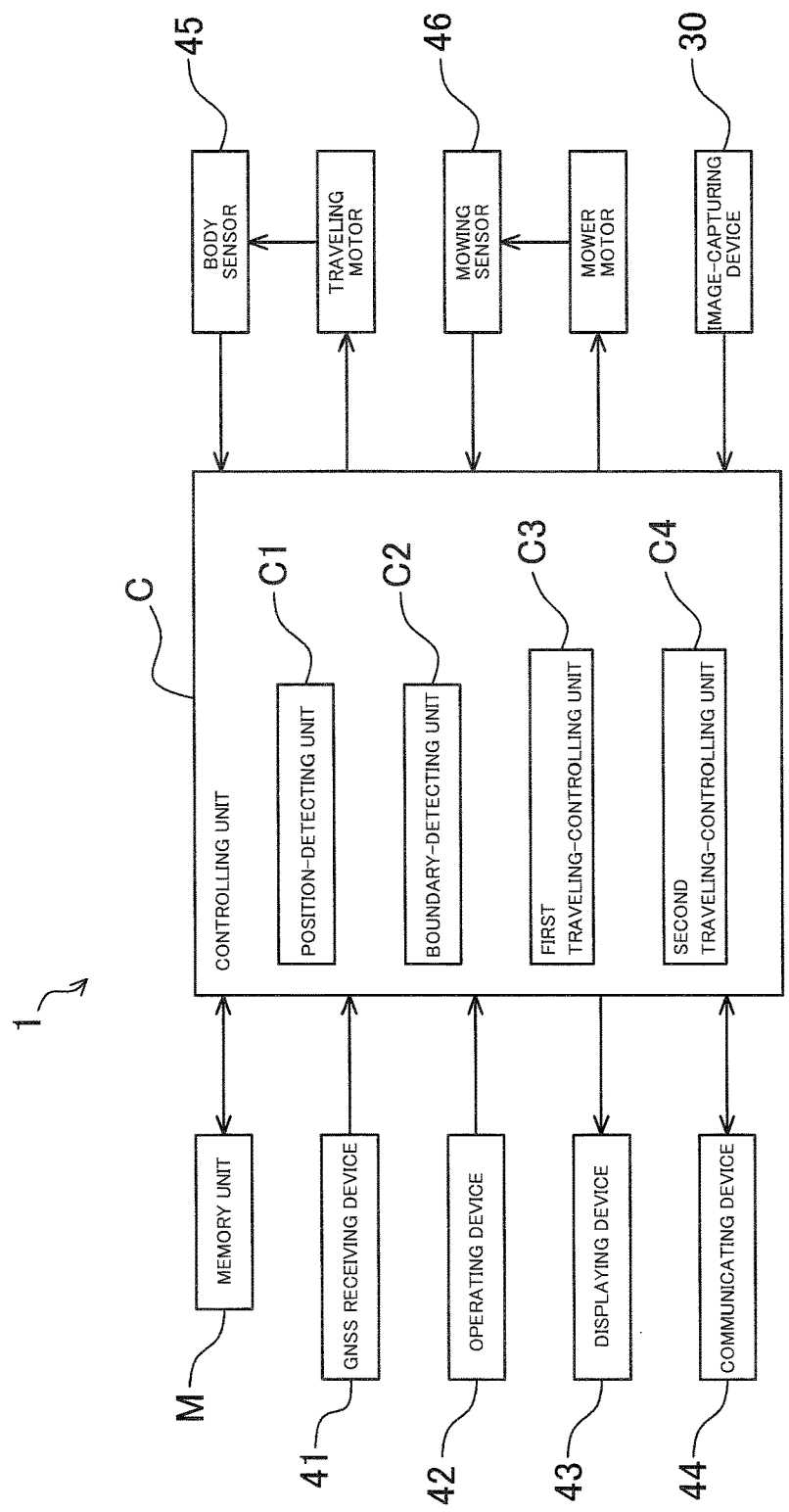
FIG. 2 is a block diagram illustrating how to detect the boundary line showing traces of work and how to control autonomous traveling.

Herein, the mowing vehicle 1 is configured to process the image captured by the image-capturing devices 30 so as to detect the boundary line of grass before and after mowing consecutively formed by the mowing device 20 and is configured to travel autonomously along the detected boundary line. Furthermore, using a global navigation satellite system (GNSS), the mowing vehicle 1 can detect a position of the traveling machine 10. FIG. 2 is a block diagram illustrating how to detect the boundary line showing the traces of work and how to control autonomous traveling. The mowing vehicle 1 includes the traveling machine 10 provided with a memory unit M, a GNSS receiving device 41, an operating device 42, a displaying device 43, a communicating device 44, a body sensor 45, a mowing sensor 46, and the like. The image-capturing devices 30, the memory unit M, the GNSS receiving device 41, the operating device 42, the displaying device 43, the communicating device 44, the body sensor 45, the mowing sensor 46, and the like are connected to the controlling unit C.

The controlling unit C is configured to read various setting values and input signals such as detection values obtained by various sensors. The controlling unit C is also configured to output control signals so as to control operations of the traveling machine 10, the mowing device 20, and the image-capturing devices 30. The controlling unit C includes, for example, a processing device configured to carry out arithmetic processing and controlling processing, and a main memory configured to store information. For example, the controlling unit C is a microcomputer including a central processing unit (CPU) as the processing device, a read only memory (ROM) as the main memory, and a random access memory (RAM). The main memory stores control programs, various information, and the like for carrying out operations according to the present embodiment. It should be noted that these various programs, information, and the like may be stored in the memory unit M and read out by the controlling unit C.

The memory unit M is configured to store programs, information, and the like and is capable of rewriting the stored information and the like. An example of the memory unit M includes a flash memory. The memory unit M stores in advance a route R (to be mentioned later) along which the mowing vehicle 1 travels autonomously.

The GNSS receiving device 41 receives radio signals from GNSS satellites (not illustrated) and converts the received radio signals to transmit them to the controlling unit C. Examples of the operating device 42 include a mouse, a key board, and the like for inputting information. The operating device 42 is used for inputting information such as setting values regarding autonomous traveling of the mowing vehicle 1. The displaying device 43 is a liquid crystal display configured to display information such as a status of the arithmetic processing in the controlling unit C, information input by the operating device 42, and information stored in the memory unit M. The communicating device 44 is configured to transmit and receive information to and from an outside unit. For example, the communicating device 44 transmits to the outside unit information regarding traveling conditions of the traveling machine 10, the image captured by the image-capturing devices 30. Therefore, even from a remote location, it is possible to understand autonomous traveling conditions of the mowing vehicle 1.

The body sensor 45 is for detecting information regarding operations of the traveling machine 10. The mowing sensor 46 is for detecting information regarding operations of the mowing device 20. Herein, the body sensor 45 is a collective term for sensors configured to detect necessary information for the mowing vehicle 1 to travel autonomously. Examples of such information include a traveling speed and three-dimensional attitude of the traveling machine 10, and the number of rotation of the traveling motor. More specifically, the body sensor 45 includes rotation sensors in the right-and-left traveling motors, vehicle orientation sensor, vehicle inclination sensor, and the like. Detection signals of body sensor 45 are transmitted to the controlling unit C. Similarly, the mowing sensor 46 includes sensors configured to detect the number of rotation of the mower motor, vertical positions of the mower deck, and the like. Detection signals of the mowing sensor 46 are transmitted to the controlling unit C.

The controlling unit C includes a position detecting-unit C1. The position-detecting unit C1 includes, for example, a program. The position-detecting unit C1 is configured to calculate the position of the traveling machine 10 based on radio signals which are sent out at a certain time of a plurality of GNSS satellites and input from the GNSS receiving device 41.

The controlling unit C further includes a boundary-detecting unit C2. The boundary-detecting unit C2 includes, for example, a program. The boundary-detecting unit C2 is configured to carry out predetermined processing on image signals (image) input from one of the right-and-left image-capturing devices 30 (30R, 30L) so as to detect the boundary line of grass before and after mowing in the captured image.

Examples of the predetermined processing carried out on the image by the boundary-detecting unit C2 include filtering and statistical processing. Details will be described later but here is a brief description. The boundary-detecting unit C2 is configured to carry out filtering with a Gabor filter on the captured image input from one of the image-capturing devices 30 and to generate intensity distribution information regarding texture information in a predetermined direction. Then the boundary-detecting unit C2 carries out the statistical processing on the generated intensity distribution information so as to detect the boundary line of grass before and after mowing.

Herein, the Gabor filter is a filter responding to edges in a specific direction and is a filter which extracts features as similar to a human primary visual cortex. The Gabor filter is defined by the product of a cosine wave and a Gaussian function. The Gabor filter is represented by the following Formulas (1) to (3) in a two-dimensional coordinate system where x-axis is taken along the abscissa and y-axis is taken along the ordinate. In the Formulas (1) to (3), $\lambda$ represents a wavelength, $\theta$ represents an angle, $\phi$ represents a phase, $\gamma$ represents an aspect ratio, and $\sigma$ represents standard deviation. Each parameter is set so as to extract features in the specific direction.

[Mathematical Formula 1]

$$g(x, y) = \exp\left\{-\frac{x'^2 + (\gamma y')^2}{2\sigma^2}\right\} \cos\left(\frac{2\pi x'}{\lambda} + \phi\right) \quad (1)$$

[Mathematical Formula 2]

$$x' = x \cos\theta + y \sin\theta \quad (2)$$

[Mathematical Formula 3]

$$y' = -x \sin\theta + y \cos\theta \quad (3)$$

The controlling unit C further includes a first traveling-controlling unit C3. The first traveling-controlling unit C3 includes, for example, a program. Details will be described later but here is a brief description. The first traveling-controlling unit C3 is configured to control traveling directions of the traveling machine 10 along the boundary line of grass before and after mowing detected by the boundary-detecting unit C2. In other words, based on the boundary line detected by the boundary-detecting unit C2, the first traveling-controlling unit C3 is configured to control operations of the traveling motor and to change traveling directions of the traveling machine 10 so that the traveling machine 10 can travel along the boundary line.

The controlling unit C further includes a second traveling-controlling unit C4. The second traveling-controlling unit C4 includes, for example, a program. The second traveling-controlling unit C4 is configured to control operations of the traveling motor and to change traveling directions of the traveling machine 10 based on the position of the traveling machine 10, the route R, and the detection signals so that the traveling machine 10 can travel along the route R. The position of the traveling machine 10 is detected by the position-detecting unit C1. The route R is stored in the memory unit M in advance. The detection signals are sent from the body sensor 45.

Figure 3:
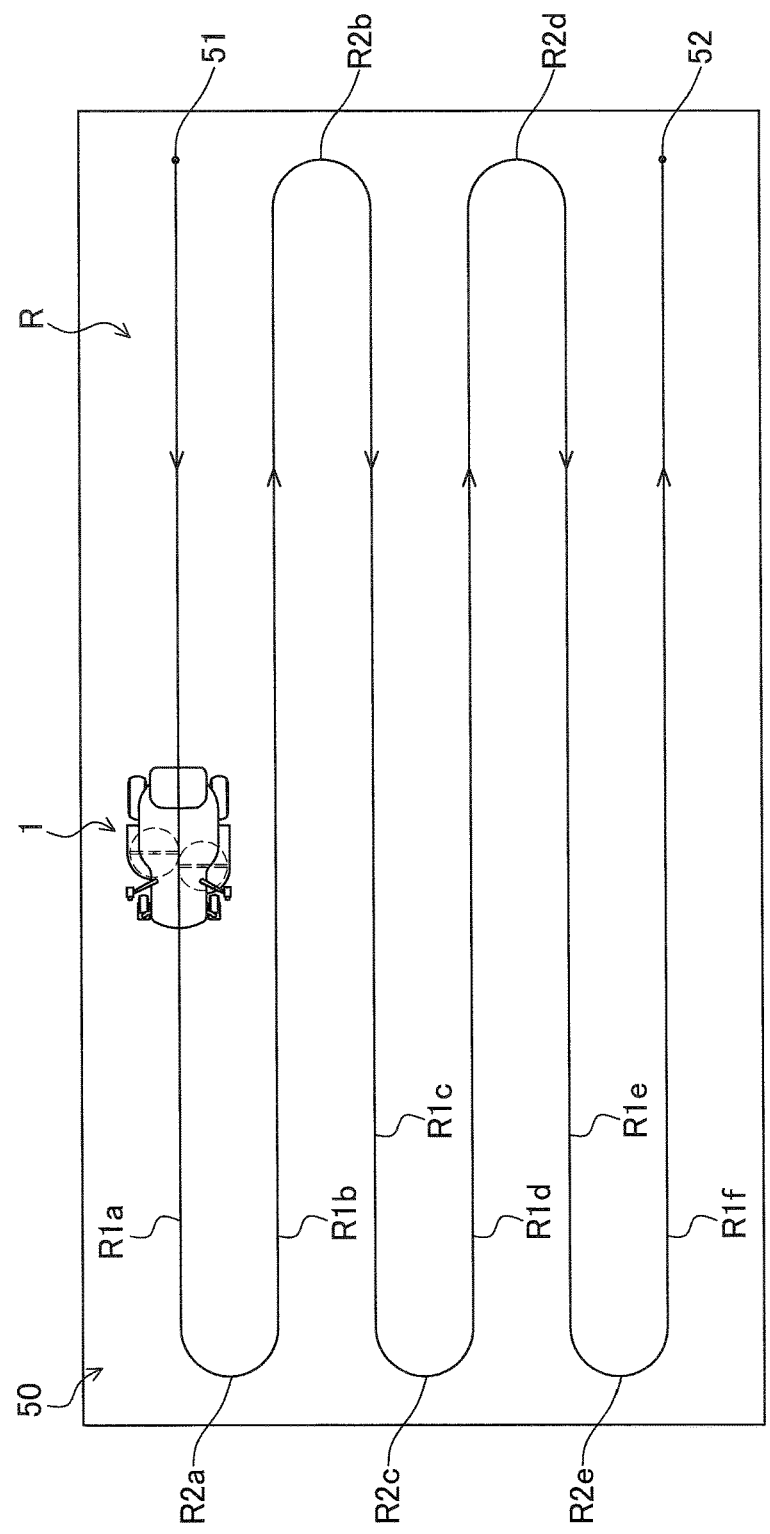
FIG. 3 is a schematic plane view illustrating an example of a route along which a mowing vehicle travels autonomously.

Hereinafter, autonomous traveling of the mowing vehicle 1 will be described. Herein, FIG. 3 is a schematic plane view illustrating an example of the route R along which the mowing vehicle 1 travels autonomously. It should be noted that arrows in FIG. 3 represent the forward directions of the mowing vehicle 1. The route R along which the mowing vehicle 1 travels autonomously is set in advance and is stored in the memory unit M in advance. The mowing vehicle 1 is configured to travel autonomously along this route R.

The route R is made, for example, in such a manner that the mowing vehicle 1 can travel back and forth in a straight line within a work field 50 as illustrated in FIG. 3. The mowing vehicle 1 mows grass by the mowing device 20 while autonomously traveling along the route R. The route R includes a plurality of straight parallel routes R1 (R1a to R1f) formed at predetermined parallel intervals and a plurality of semicircular turning routes R2 (R2a to R2e) connecting the adjacent parallel routes R1. An interval between adjacent parallel routes R1 is substantially equal to the mowing width W of the mowing device 20 and is appropriately designed in accordance with a size and the like of the mowing device 20.

The mowing vehicle 1 travels from a traveling-starting-point 51 and along the parallel route R1a. Then, the mowing vehicle 1 travels along the turning route R2a at an end of the work field 50 to make a half turn. Consequently, the mowing vehicle 1 travels along the parallel route R1b adjacent to the parallel route R1a where the mowing vehicle 1 has just traveled. The mowing vehicle 1 repeatedly travels back and forth until reaching a traveling-terminal point 52 and mows grass in the work field 50. Herein, the interval between adjacent parallel routes R1 is substantially equal to the mowing width W of the mowing device 20. Therefore, when traveling along the parallel routes R1b to R1f excluding the parallel route R1a extending from the traveling-starting-point 51, the mowing vehicle 1 travels in a state of being adjacent to an area with grass mown.

Herein, the interval between the adjacent parallel routes R1 is preferably narrower than the mowing width W of the mowing device 20. In such manners, the mowing device 20 can travel, preparing an area lapping with the area with grass mown so that no grass may be unmown and leftover between the adjacent parallel routes R1.

Furthermore, information regarding the route R does not necessarily include the whole positional information on the route. The information regarding the route R herein includes the traveling-starting-point 51, traveling-terminal point 52, positional information of start and terminal points of each turning route R2, and information of a radius of each turning route R2.

Accordingly, the mowing vehicle 1 autonomously travels along the parallel route R1a and turning route R2a from the traveling-starting-point 51 to an end of the turning route R2a. In the parallel route R1a and turning route R2a, the mowing vehicle 1 autonomously travels under the control of the second traveling-controlling unit C4.

Figure 4:
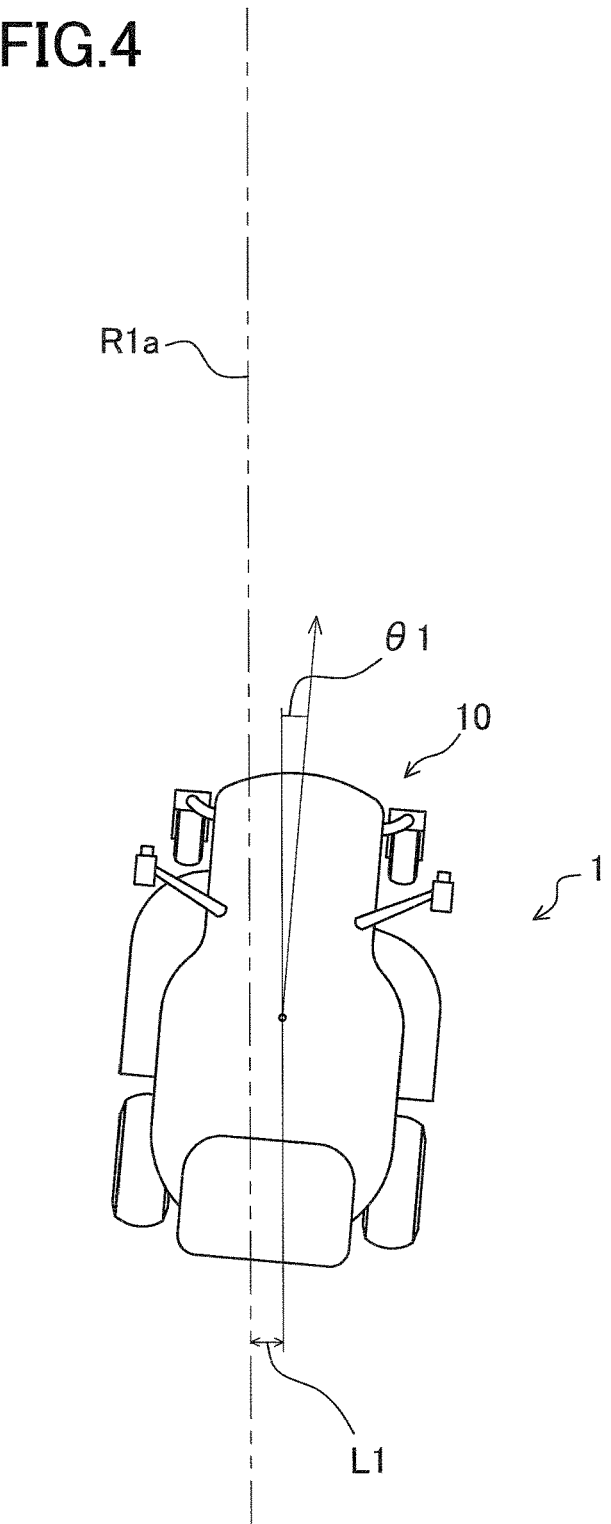
FIG. 4 is a schematic plane view explaining an example of deviation of a traveling machine from the route.

The mowing vehicle 1 calculates an amount of deviation of the traveling machine 10 from the parallel route R1a, by the second traveling-controlling unit C4 based on the position of the traveling machine 10, the parallel route R1a, and the orientation of the traveling machine 10. The position of the traveling machine 10 is detected by the position-detecting unit C1. The orientation of the traveling machine 10 is sent from the body sensor as detection signals. Examples of the amount of deviation include a deviation distance L1 of the center of the traveling machine 10 from the parallel route R1a, and a deviation angle θ1 formed by the orientation (traveling direction) of the traveling machine 10 and the parallel route R1a as illustrated in FIG. 4. Herein, FIG. 4 is a schematic plane view explaining an example of the deviation of the traveling machine 10 from the route R. An arrow in FIG. 4 represents the traveling direction of the traveling machine 10.

The mowing vehicle 1 then controls an operation of the traveling motor and changes the traveling direction of the traveling machine 10 by the second traveling-controlling unit C4 based on the calculated amount of deviation of the traveling machine 10 from parallel route R1a so that the traveling machine 10 can travel along the parallel route R1a. In regard to detection of positions of the traveling machine 10 by the position-detecting unit C1 and change of traveling directions of the traveling machine 10 by the second traveling-controlling unit C4, those are carried out at a predetermined sampling cycle, for example, one-second cycle.

Reaching the starting point of the turning route R2a (the terminal point of the parallel route R1a), the mowing vehicle 1 controls the operation of the traveling motor and changes the traveling direction of the traveling machine 10 by the second traveling-controlling unit C4 based on the position of the traveling machine 10 detected by the position-detecting unit C1, the turning route R2a, and the detection signals from the body sensor 45. Then, the mowing vehicle 1 makes the traveling machine 10 travel along the turning route R2a. Herein, the turning route R2a has a semicircular shape having a predetermined radius (W/2) so that the mowing vehicle 1 is to take a 180-degree turn counterclockwise. Therefore, the mowing vehicle 1 can make the traveling machine 10 travel along the turning route R2a by just controlling the traveling motor to perform a predetermined operation by the second controlling unit C4. As similar to the parallel route R1a, in the turning route R2a, the second traveling-controlling unit C4 may be configured to calculate an amount of deviation of the traveling machine 10 from the turning route R2a so that the traveling machine 10 can travel along the turning route R2a.

Reaching the terminal point of the turning route R2a (the starting point of the parallel route R1b), next, the mowing vehicle 1 autonomously travels along the parallel route R1b till the terminal point of the parallel route R1b (the starting point of the turning route R2b). When traveling along the parallel route R1b, note that the mowing vehicle 1 travels in a state of being adjacent to an area with grass mown while traveling along the parallel route R1a. In other words, in traveling along the parallel route R1b, the mowing vehicle 1 travels along a boundary line (a boundary line of grass before and after mowing) between the area with grass mown while traveling along the parallel route R1a and an area with yet-to-be-mown grass which is to be mown while traveling along the parallel route R1b. The mowing vehicle 1 then autonomously travels along the parallel route R1b under the control of the first traveling-controlling unit C3.

The mowing vehicle 1 detects the boundary line of grass before and after mowing by the boundary-detecting unit C2. The mowing vehicle 1 also controls the operation of the traveling motor and changes the traveling direction of the traveling machine 10 by the first traveling-controlling unit C3 based on the detected boundary line of grass before and after mowing. The mowing vehicle 1 then makes the traveling machine 10 travel along the boundary line so as to travel autonomously along the parallel route R1b. In regard to detection of boundary line by the boundary-detecting unit C2 and change of traveling directions of the traveling machine 10 by the first traveling-controlling unit C3, those are carried out at a predetermined sampling cycle, for example, one-second cycle as similar to the case in the position-detecting unit C1 and the second traveling-controlling unit C4. Even in traveling along the parallel route R1*b*, the mowing vehicle 1 detects the position of the traveling machine 10 by the position-detecting unit C1 at the predetermined cycle.

Figure 5:
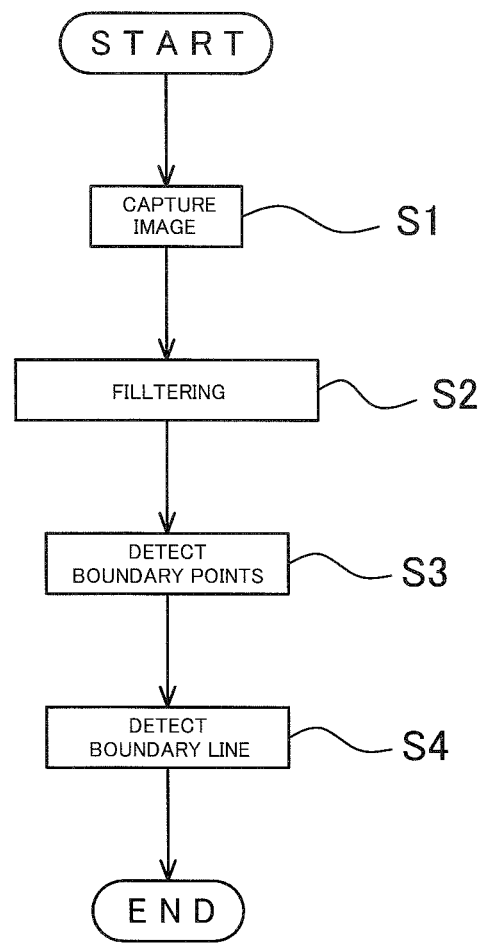
FIG. 5 is a flowchart explaining an example of detection carried out by a boundary-detecting unit.
Figure 6:
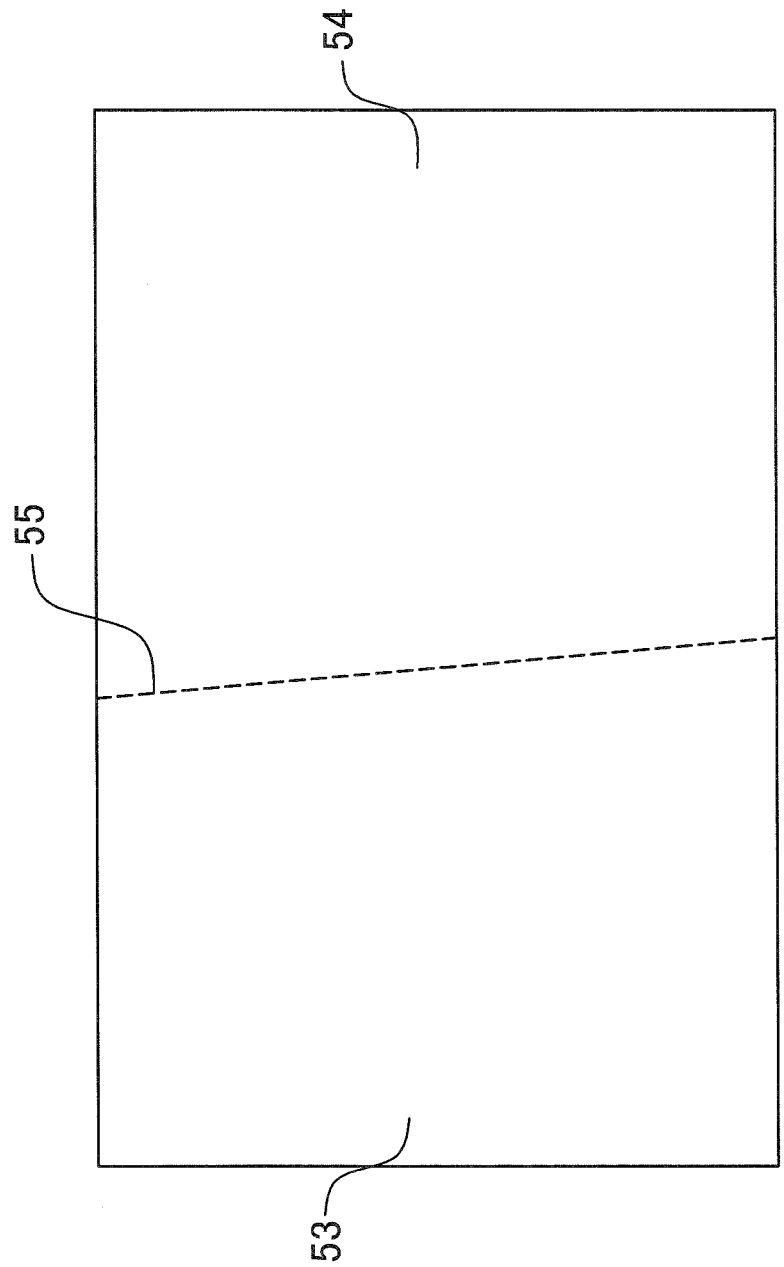
FIG. 6 is a schematic view illustrating an example of an image captured by an image-capturing device.

Hereinafter described is a technique for detecting, by the boundary-detecting unit C2, a boundary line of grass before and after mowing. FIG. 5 is a flowchart explaining an example of detection carried out by the boundary-detecting unit C2. The mowing vehicle 1 captures the ground in front of the mowing vehicle 1 by the left image-capturing device 30L disposed in a side on which a boundary line of grass before and after mowing is located (step S1). A schematic view of an example of a captured image is illustrated in FIG. 6. In FIG. 6, a boundary line 55 between an area 53 with grass mown and an area 54 with grass unmown is illustrated. The captured image herein has height 480×width 640 in pixels. Brightness information of each pixel among the height 480×width 640 in pixels is input to the boundary-detecting unit C2.

Note that, the right image-capturing devices 30R is disposed in a part corresponding to right edge of areas with grass to be mown by the mowing device 20 and the left image-capturing devices 30L is disposed in a part corresponding to left edge of the areas. Therefore, a center in the horizontal direction of an image captured by the right image-capturing device 30R corresponds to the right edge of the areas with grass to be mown by the mowing device 20. A center in the horizontal direction of an image captured by the left image-capturing devices 30R corresponds to the left edge of the areas. Suppose that the orientation of the traveling machine 10 is parallel to the boundary line 55 between the area 53 with grass mown and the area 54 with grass unmown and that the left edge of the track of rotation at the end of the left mower blade 22L of the mowing device 20 is on the boundary line 55. In such a case, the boundary line 55 is to be placed at the center in the horizontal direction of an image captured by the left image-capturing device 30L. In other words, the left image-capturing device 30L is disposed in such a manner that the boundary line 55 is placed at the center in the horizontal direction of the image captured when the mowing vehicle 1 travels along the parallel route R1*b*.

Next, the boundary-detecting unit C2 carries out the filtering with a Gabor filter on the image captured by the left image-capturing device 30L (step S2). The grass extends upward from the ground. The boundary line of grass before and after mowing represent boundary line between areas having different texture patterns depending on lengths of the grass and orientation of the extension. In other words, the area with grass mown and the area with grass unmown have differences in image features in the vertical direction. The boundary line between areas having the different features in the vertical direction can be regarded as the boundary line of grass before and after mowing. Herein, in the Formulas (1) to (3), in order to extract the features in the vertical direction, each parameter is set as follows: $\lambda=2$, $\theta=90$, $\phi=0$, $\gamma=0.5$, and $\sigma=0.38$. Therefore, the image filtered with the Gabor filter is regarded as intensity distribution information in the upward direction. It should be noted that each parameter is not restricted to the above values and can be appropriately designed. Herein, $\theta$ is set to 90 as the parameter for extracting features in the upward direction. However, $\theta$ may be set to 270 as a parameter for extracting features in the downward direction as long as the features in the vertical direction can be extracted.

Before carrying out the filtering with the Gabor filter, filtering for removing noise from an image may also be carried out. In such a case, when carrying out the filtering with the Gabor filter, it is possible to extract features in a specific direction more clearly. The filtering for removing noise is not specifically restricted. An applicable example for such filtering includes conversion of a color image into a gray scale, and filtering with median filters in which each pixel value is replaced by a median of peripheral pixels.

Next, the boundary-detecting unit C2 detects boundary points on the boundary line 55 of grass before and after mowing with respect to the image filtered with the Gabor filter (step S3). The image filtered with the Gabor filter is divided in the vertical direction so as to set a plurality of inspection areas. Each of the inspection areas is divided in the horizontal direction so as to set a plurality of inspection unit areas. Herein, the image filtered with the Gabor filter is equally divided in the vertical direction so as to set thirty inspection areas. Each of the inspection areas is equally divided in the horizontal direction so as to set forty inspection unit areas. In other words, the image filtered with the Gabor filter is divided into one thousand two hundred inspection unit areas in total.

Figure 7:
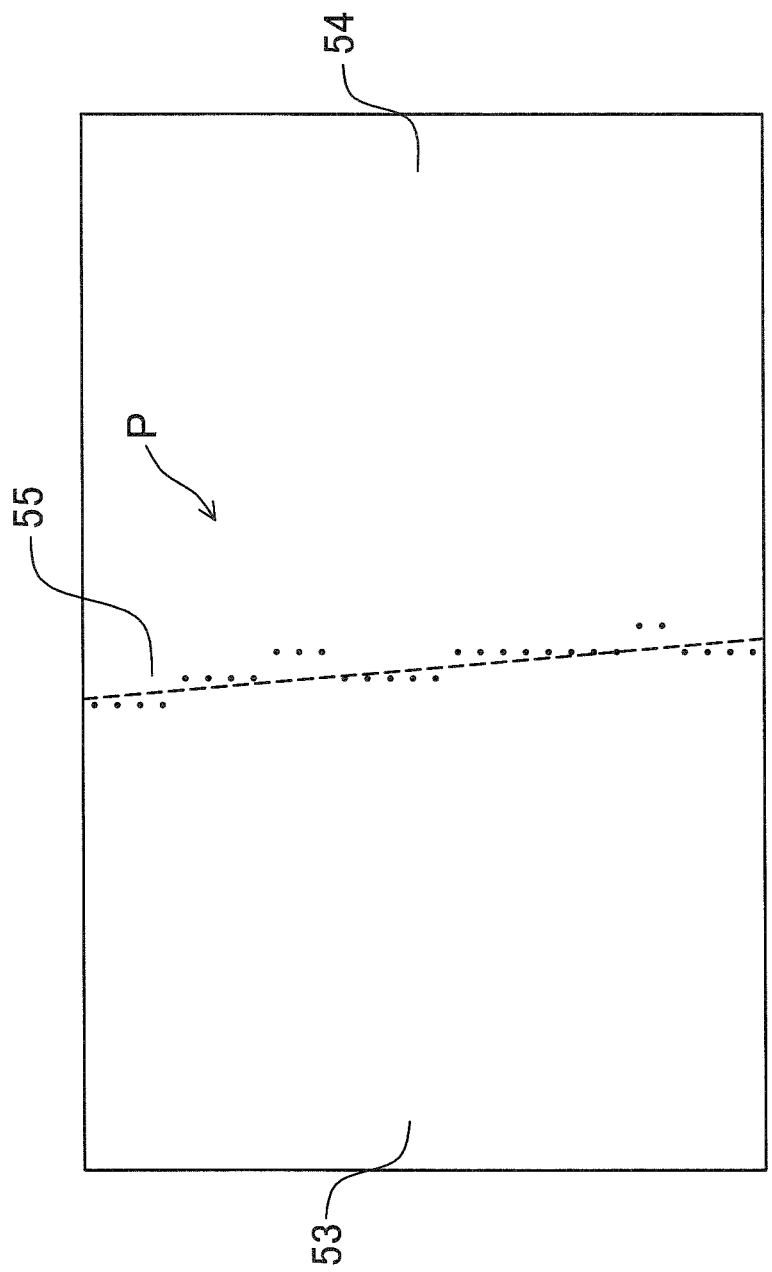
FIG. 7 is a schematic view illustrating an example of a plurality of detected boundary points.

The boundary-detecting unit C2 calculates a sum of brightness in each inspection unit area. The boundary-detecting unit C2 also calculates an average of the sum of brightness of the forty inspection unit areas in each inspection area and sets the average as a threshold of the inspection areas. From the left to the right, the boundary-detecting unit C2 divides the threshold from the sum of the brightness in inspection unit areas per inspection area. The boundary-detecting unit C2 then determines the boundary points by comparing positive and negative of the divided value with positive and negative of the preceding divided value. When positive and negative of the divided value is different from the positive and negative of the preceding divided value, the boundary-detecting unit C2 determines the center of the inspection unit area as the boundary point. FIG. 7 is a schematic view illustrating an example of a plurality of detected boundary points P illustrated in the schematic view in FIG. 6.

Herein, the threshold used for determining the boundary points is calculated per inspection area so that there is no need to set the threshold in advance. Therefore, it is possible to determine the boundary points more accurately with less affected by conditions of grass and light, brightness, and heuristics.

It should be noted that a technique for detecting boundary points is not restricted to the above. Sizes of inspection areas, that of inspection unit areas, a technique for determining a threshold, and the like are to be designed appropriately as long as boundary points on a boundary line of grass before and after mowing is detected from an image filtered with the Gabor filter, which is the intensity distribution information of a predetermined direction. For example, an inspection unit area may also be set to lap over other inspection unit areas of interest in both sides. Furthermore, a threshold may also be calculated by using a simple moving average with respect to the horizontal direction. Alternatively, one threshold may be determined per image.

Furthermore, there is no need to detect the boundary points with respect to the whole area of the image filtered with the Gabor filter. Herein, the right-and-left image-capturing devices 30R, 30L are respectively disposed in the right-and-left edges of the areas with grass to be mown by the mowing device 20. Therefore, in images captured by the right-and-left image-capturing devices 30R, 30L, the boundary line 55 is tend to be captured substantially at the center in the horizontal direction. Therefore, the boundary points may be detected with respect to an area in a central part in the horizontal direction of the image filtered with the Gabor filter. In such a case, it is possible to reduce arithmetic volume of the boundary-detecting unit C2. Furthermore, in regard to the horizontal direction of each inspection area, sizes of the inspection unit areas in the central part may be set small, and sizes of the inspection unit areas in the right-and-left parts may be set large. By setting in such manners, it is possible to reduce the arithmetic volume of the boundary-detecting unit C2.

Furthermore, such an embodiment is applicable that an average of thresholds calculated per inspection area is stored in the memory unit M. In such an embodiment, next time when detecting boundary points from an image captured by the image-capturing devices 30, the boundary points may be detected regarding this average of the thresholds stored in the memory unit M as a threshold. Accordingly, it is not necessary that the boundary-detecting unit C2 should calculate a threshold every time, which leads to reduction in the arithmetic volume of the boundary-detecting unit C2. In such a case, next time when calculating boundary points, the boundary-detecting unit C2 may be configured to calculate a threshold and to detect the boundary points in accordance with the number of boundary points which are outliers (to be mentioned later). This is because the threshold is considered to be inappropriate when the number of the boundary points as the outliers is large. Therefore, in such manners, the boundary points can be detected more accurately.

Furthermore, the threshold used for determining the boundary points may be set in advance. In such a case, even when the area 53 with grass mown or the area 54 with grass unmown is narrow in images captured by the right-and-left image-capturing devices 30R and 30L, it is possible to detect the boundary points more accurately. In other words, even when the boundary line 55 is not located near the center of the images but near the right or left ends thereof, it is possible to detect the boundary points more accurately.

Next, the boundary-detecting unit C2 detects the boundary line 55 of grass before and after mowing based on the boundary points P per detected inspection area (step S4). Herein, the boundary points P per inspection area detected in step S3 may include boundary points considerably off the boundary line 55. Therefore, the boundary-detecting unit C2 extracts boundary points P within a predetermined error range and detects the boundary line 55 based on a plurality of these extracted boundary points P.

The boundary-detecting unit C2 extracts the boundary points P within the predetermined error range using random sample consensus (RANSAC). More specifically, the boundary-detecting unit C2 randomly selects two boundary points P from all the boundary points P detected in step S3 and calculates a straight line passing these two boundary points P. The boundary-detecting unit C2 calculates distances between the calculated straight line and all the boundary points P detected in step S3 and extracts only boundary points P having a distance shorter than a predetermined threshold. Next, the boundary-detecting unit C2 randomly selects two boundary points P from these extracted boundary points P as similar to the above manner, and calculates a straight line passing these two boundary points P. Then, the boundary-detecting unit C2 calculates distances from the calculated straight line to all the extracted boundary points P so as to newly extract only boundary points P having a distance shorter than the predetermined threshold. By repeating the extraction of the boundary points for a plurality of times, the boundary-detecting unit C2 extracts boundary points P included within the predetermined error range (within the threshold) from all the boundary points P detected in step S3. Herein, the number of repetition of this extraction is set to 50 times.

Figure 8:
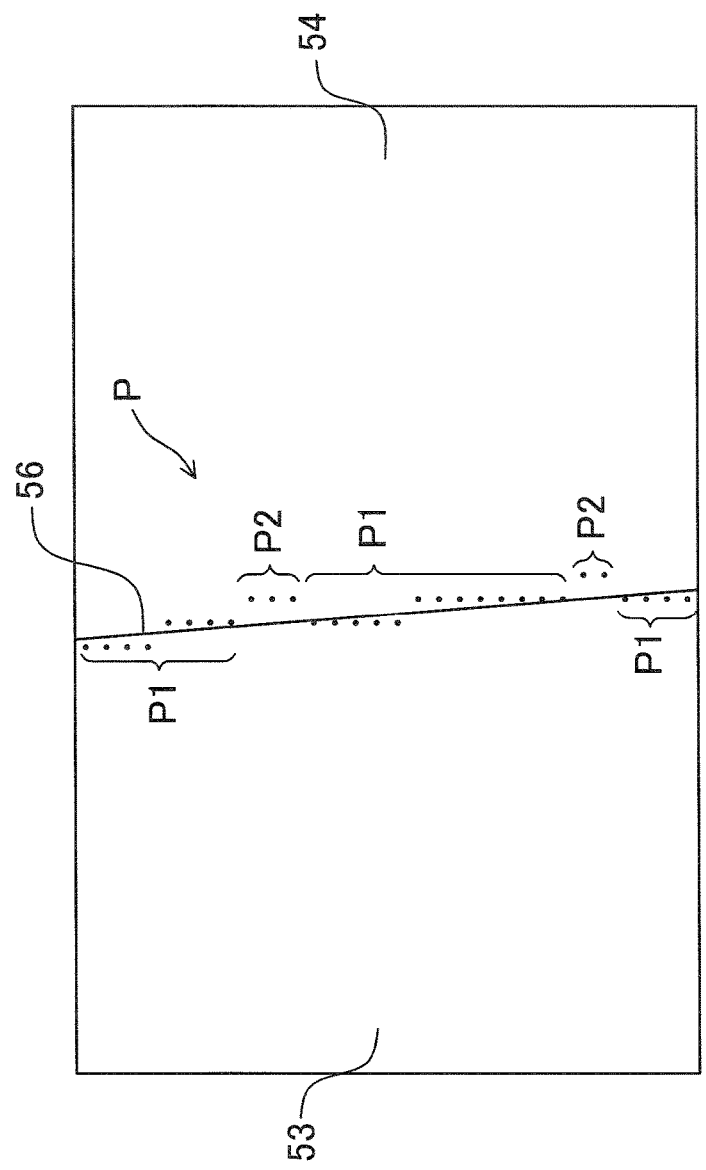
FIG. 8 is a schematic view illustrating an example of the plurality of detected boundary points and a detected boundary line.

The boundary-detecting unit C2 then detects the boundary line 55 from the boundary points P extracted using RANSAC, by a least-squares approach. FIG. 8 is a schematic view illustrating an example of a plurality of detected boundary points P and a detected boundary line 56 illustrated in the schematic view in FIG. 6. In FIG. 8, among the detected plurality of boundary points P, boundary points used for detecting the boundary line 55 are represented by boundary points P1, and the outliers not used for detecting the boundary line 55 are represented by boundary points P2. Herein, description of the captured boundary line 55 will be omitted.

It should be noted that a technique for detecting the boundary line 55 is not restricted to the above. The number of repetition of extracting boundary points P and threshold are to be designed appropriately. Furthermore, boundary points P may be extracted by a technique different from RANSAC. For example, boundary points P may be extracted by a least-squares approach. However, in a case of applying the least-squares approach, results do not have stability for disturbance (outliers) so that it is preferable to apply an extraction technique with robustness.

Herein, the boundary-detecting unit C2 is configured to detect the boundary line based on the intensity distribution information in the upward direction generated from the captured image by the filtering with the Gabor filter in the upward direction. In other words, the boundary-detecting unit C2 is configured to carry out filtering using one Gabor filter so that information volume to be subject to the statistical processing may not increase and that the boundary line can be detected with a simple structure.

Another technique for detecting boundary line includes the following technique. In this technique, a captured image is filtered with a plurality of Gabor filters having different parameters of directions (angles) and intensity distribution information in a plurality of directions is generated. The intensity distribution information in the plurality of directions is subject to the statistical processing so as to detect the boundary line. For example, in Formulas (1) to (3), applied are thirty-six Gabor filters in which the parameter of the directions (angles) θ is set to 0, 15, 30, 45, 60, 75, 90, 105, 120, 135, 150, and 165 and in which standard deviation σ with respect to θ is set to 1.2, 1.6, and 2.2. In regard to other parameters, γ is set to 0.5, φ is set to 0, and λ is set to 2.13, 2.85, or 3.91 in accordance with values of the standard deviations σ.

The filtering with the thirty-six Gabor filters is carried out on the captured image. Due to this filtering, intensity information in each direction is generated with respect to each pixel. In other words, thirty-six of pieces of intensity information are generated with respect to each pixel. It should be noted that the intensity information of each pixel is a value obtained by adding to brightness of each pixel the product of the brightness of each pixel and a value calculated by the filtering. In each pixel, the maximum of the thirty-six of pieces of intensity information is extracted and a direction of a Gabor filter (θ) in which the maximum intensity information has been generated is regarded as the texture information in the pixel so as to generate texture distribution information. In such manners, it is possible to extract texture patterns in the captured image as the texture distribution information.

As mentioned above, the area with grass mown and the area with grass unmown are reflected in the image, and these two areas have different texture patterns depending on lengths of the grass and orientation of the extension. Therefore, by binarizing the generated texture distribution information at a predetermined angle, for example, $\theta=30$ as a threshold, it is possible to extract the area with grass mown and the area with grass unmown. In other words, the information (image) generated by binarization is an image in which the captured image is divided into the area with grass mown and the area with grass unmown. With the technique for detecting boundary points and direction of detecting boundary line, the boundary line of grass before and after mowing can be detected from the image generated by this binarization. In such manners, it is possible to detect the boundary line based on the intensity distribution information regarding the texture information in the plurality of directions and to detect the boundary line more accurately.

It should be noted that the technique for detecting boundary line using the plurality of Gabor filters is not restricted to the above. For example, the filtering for eliminating noise may be carried out on the image generated by the binarization. In such manners, it is possible to detect the boundary points more accurately. Furthermore, the number of the Gabor filters, value of each parameter, threshold, and the like are not restricted to the aforementioned numerical values and may be designed appropriately. Furthermore, in a case of applying the aforementioned one Gabor filter, binarization similar to the above may be applied to the intensity distribution information generated by the filtering, and boundary points may be detected based on the image generated by binarization.

As mentioned above, the mowing vehicle 1 controls the operation of the traveling motor and changes the traveling direction of the traveling machine 10 by the first traveling-controlling unit C3 based on the detected boundary line 56 of grass before and after mowing detected by the boundary-detecting unit C2 so as to autonomously travel along the boundary line.

Figure 9:
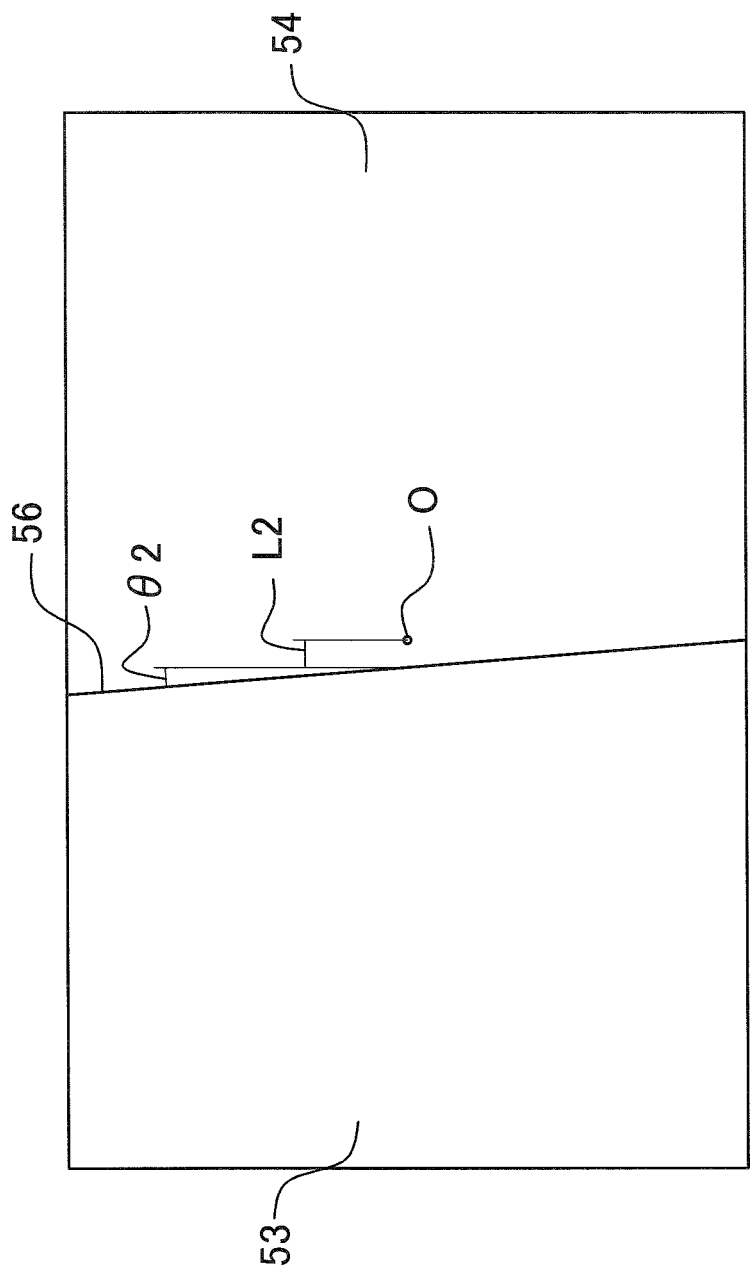
FIG. 9 is a schematic view explaining an example of deviation of the traveling machine from the detected boundary line.
Figure 10:
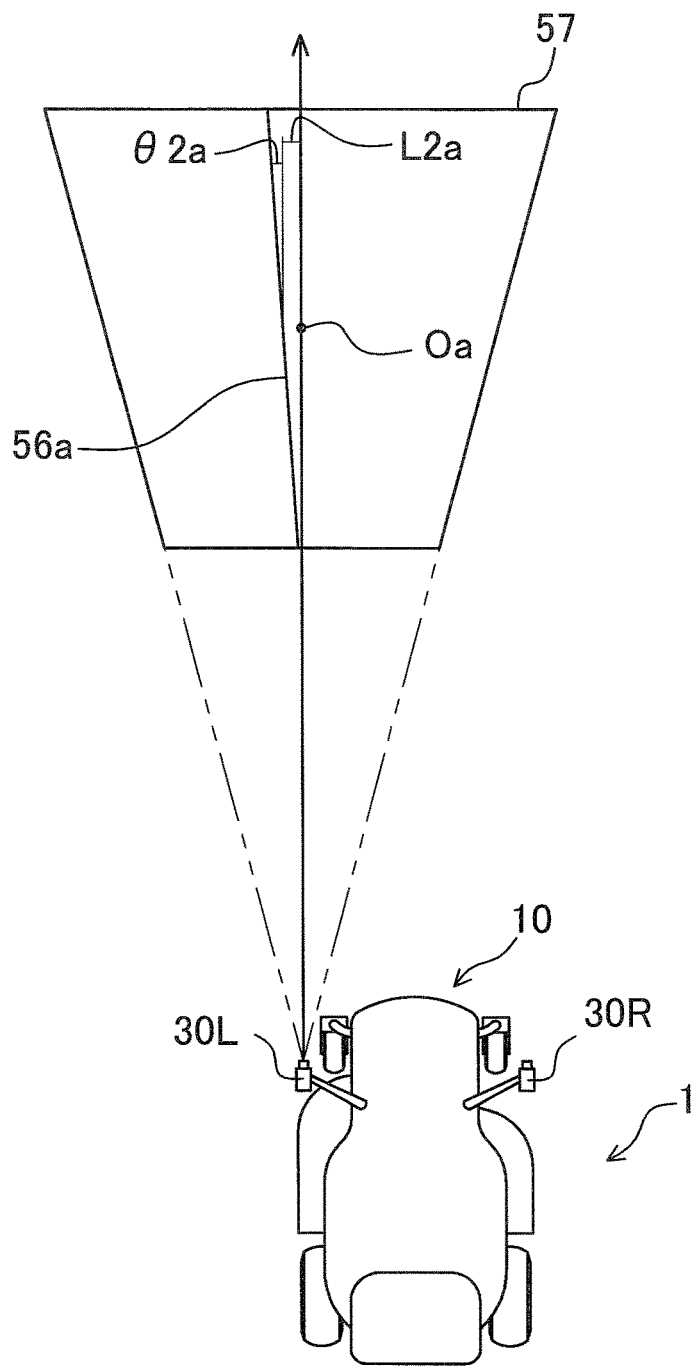
FIG. 10 is a schematic plane view explaining the example of the deviation of the traveling machine from the detected boundary line.

More specifically, based on the detected boundary line 56 detected by the boundary-detecting unit C2, an amount of deviation of the traveling machine 10 from the detected boundary line 56 is calculated by the first traveling-controlling unit C3. Examples of the amount of deviation include a deviation distance L2 and a deviation angle $\theta 2$ as illustrated in FIGS. 9 and 10. The deviation distance L2 is a distance in the horizontal direction between a reference point O of the image captured by the left image-capturing device 30L and the detected boundary line 56. The deviation angle $\theta 2$ is an angle representing inclination of the detected boundary line 56 with respect to the vertical direction. Herein, FIG. 9 is a schematic view explaining an example of the deviation of the traveling machine 10 from the detected boundary line 56. FIG. 10 is a schematic plane view explaining the example of the deviation of the traveling machine 10 from the detected boundary line 56. In FIG. 9, the detected boundary points P in the schematic view of FIG. 8 are omitted and the reference point O, deviation distance L2, and deviation angle $\theta 2$ are illustrated. The reference point O is a central point in the image in the vertical direction and in the horizontal direction. In FIG. 10, a detected boundary line 56a, a reference point Oa, a deviation distance L2a, and a deviation angle $\theta 2a$ are illustrated. The detected boundary line 56a, the reference point Oa, the deviation distance L2a, and the deviation angle $\theta 2a$ are respectively corresponding to the detected boundary line 56, reference point O, deviation distance L2, and deviation angle $\theta 2$ in FIG. 9. An area 57 represents an area to be reflected in the image, and an arrow represents the traveling direction of the traveling machine 10.

Herein, as illustrated in FIGS. 9 and 10, the deviation distance L2 and deviation angle $\theta 2$ in FIG. 9 (in the image) are different from the deviation distance L2a and deviation angle $\theta 2a$ in FIG. 10 (in a real space). Therefore, the first traveling-controlling unit C3 uses the deviation distance L2a and deviation angle $\theta 2a$. The deviation distance L2a and deviation angle $\theta 2a$ are obtained by performing coordinate transformation on the deviation distance L2 and deviation angle $\theta 2$ calculated from the detected boundary line 56 detected by the boundary-detecting unit C2.

As mentioned above, the left image-capturing device 30L is disposed in such a manner that, in a case where the orientation of the traveling machine 10 is parallel to the boundary line 55 of grass before and after mowing and where the left end portion of the track of rotation of the left mower blade 22L included in the mowing device 20 is on the boundary line, the boundary line 55 is placed at the center in the horizontal direction of the captured image. Therefore, it is possible for the first traveling-controlling unit C3 to calculate the amount of deviation of the traveling machine 10 from the detected boundary line 56 relatively easily based on the center in the horizontal direction of the image, so that the arithmetic volume of the first traveling-controlling unit C3 can be reduced.

The mowing vehicle 1 then controls the operation of the traveling motor and changes the traveling direction of the traveling machine 10 by the first traveling-controlling unit C3 based on the amount of deviation (the deviation distance L2a and deviation angle $\theta 2a$) of the traveling machine 10 from the detected boundary line 56 so as to autonomously travel along the boundary line of grass before and after mowing.

As similar to the traveling along the turning route R2b, when reaching the starting point of the turning route R2b (the terminal point of the parallel route R1b), the mowing vehicle 1 controls the operation of the traveling motor and changes the traveling direction of the traveling machine 10 by the second traveling-controlling unit C4 based on the position of the traveling machine 10 detected by the position-detecting unit C1, the turning route R2b, and the detection signals from the body sensor 45. Then, the mowing vehicle 1 makes the traveling machine 10 travel along the turning route R2b. Herein, the clockwise turning route R2b is different in a turning direction from the counter-clockwise turning route R2a. Therefore, as similar to the traveling of the turning route R2a, the mowing vehicle 1 can make the traveling machine 10 travel along the turning route R2b by just controlling the traveling motor to perform a predetermined operation by the second traveling-controlling unit C4. As similar to the parallel route R1b, in the turning route R2b, the second traveling-controlling unit C4 may be configured to calculate an amount of deviation of the traveling machine 10 from the turning route R2b so that the traveling machine 10 can travel along the turning route R2b.

Reaching the terminal point of the turning route R2b (the starting point of the parallel route R1c), next, the mowing vehicle 1 autonomously travels along the parallel route R1c till the terminal point of the parallel route R1c (the starting point of the turning route R2c). As similar to the parallel route R1b, in traveling along the parallel route R1c, the mowing vehicle 1 travels along a boundary line (a boundary line of grass before and after mowing) between an area with grass mown while traveling along the parallel route R1*b* and an area with yet-to-be-mown grass which is to be mown while traveling along the parallel route R1*c*.

As similar to the traveling of the parallel route R1*b*, the mowing vehicle 1 detects the boundary line of grass before and after mowing by the boundary-detecting unit C2. The mowing vehicle 1 also controls the operation of the traveling motor and changes the traveling direction of the traveling machine 10 by the first traveling-controlling unit C3 based on the detected boundary line of grass before and after mowing so that the traveling machine 10 can travel along the boundary line so as to travel autonomously along the parallel route R1*c*.

Herein, in traveling along the parallel route R1*b*, the boundary line of grass before and after mowing is in the left side of the traveling machine 10, but in traveling along the parallel route R1*c*, the boundary line of grass before and after mowing is in the right side of the traveling machine 10. Therefore, the boundary-detecting unit C2 detects the boundary line of grass before and after mowing based on the image captured by the right image-capturing device 30R. In regard to the detection of the boundary line of grass before and after mowing by the boundary-detecting unit C2 and the change of the traveling direction of the traveling machine 10 by the first traveling-controlling unit C3, a case of traveling along the parallel route R1*c* is similar to the case of traveling along the parallel route R1*b* except for a slight difference, that is, one of the image-capturing devices 30 to be used is switched. Therefore, description regarding the detection of the boundary line and the change of the traveling direction will be omitted.

Herein, the switch of the right-and-left image-capturing devices 30R, 30L is determined depending on the route R. Information for determining which of the right-and-left image-capturing devices 30R, 30L should be used is stored in the memory unit M, related to the route R. Note that the following embodiment is also applicable. That is, presence of boundary line is determined by the boundary-detecting unit C2 in regard to each image captured by the right-and-left image-capturing devices 30R and 30L, and based on a determination result, the boundary-detecting unit C2 determines which of the right-and-left image-capturing devices 30R, 30L is to be used. In such a case, it is possible to reduce information volume to be stored in the memory unit M in advance. Furthermore, in such a case, even when the traveling machine 10 is considerably off the route R, it is possible to continue autonomous traveling so that work efficiency can improve.

The mowing vehicle 1 consecutively travels along the adjacent parallel routes R1 and the turning routes R2 connecting the parallel routes R1. The mowing vehicle 1 stops the autonomous traveling when reaching the traveling-terminal point 52. Herein, the mowing vehicle 1 travels in a state of being adjacent to the area with grass mown when traveling from the traveling-starting-point 51 along the parallel routes R1*b* to R1*f* excluding the parallel route R1*a*. The mowing vehicle 1 herein autonomously travels along the boundary line of grass before and after mowing consecutively formed by the mowing device 20. Therefore, there is no possibility of grass unmown and leftover between the adjacent parallel routes R1. Furthermore, the filtering with the Gabor filter is carried out with a Gabor filter in a specific direction (upward direction) so that there is no possibility that the arithmetic volume of the boundary-detecting unit C2 increases. Still further, it is possible to detect the boundary line more accurately with a simple structure. Still further, the right-and-left image-capturing devices 30R, 30L are disposed in such a manner that the boundary line is placed substantially at the center in the horizontal direction of the image captured when the mowing vehicle 1 travels along the boundary line. Accordingly, it is possible to avoid such a situation that the boundary line may not be captured. Still further, the image-capturing devices 30 require no complicated calibration and their dispositions are hardly restricted.

Figure 11:
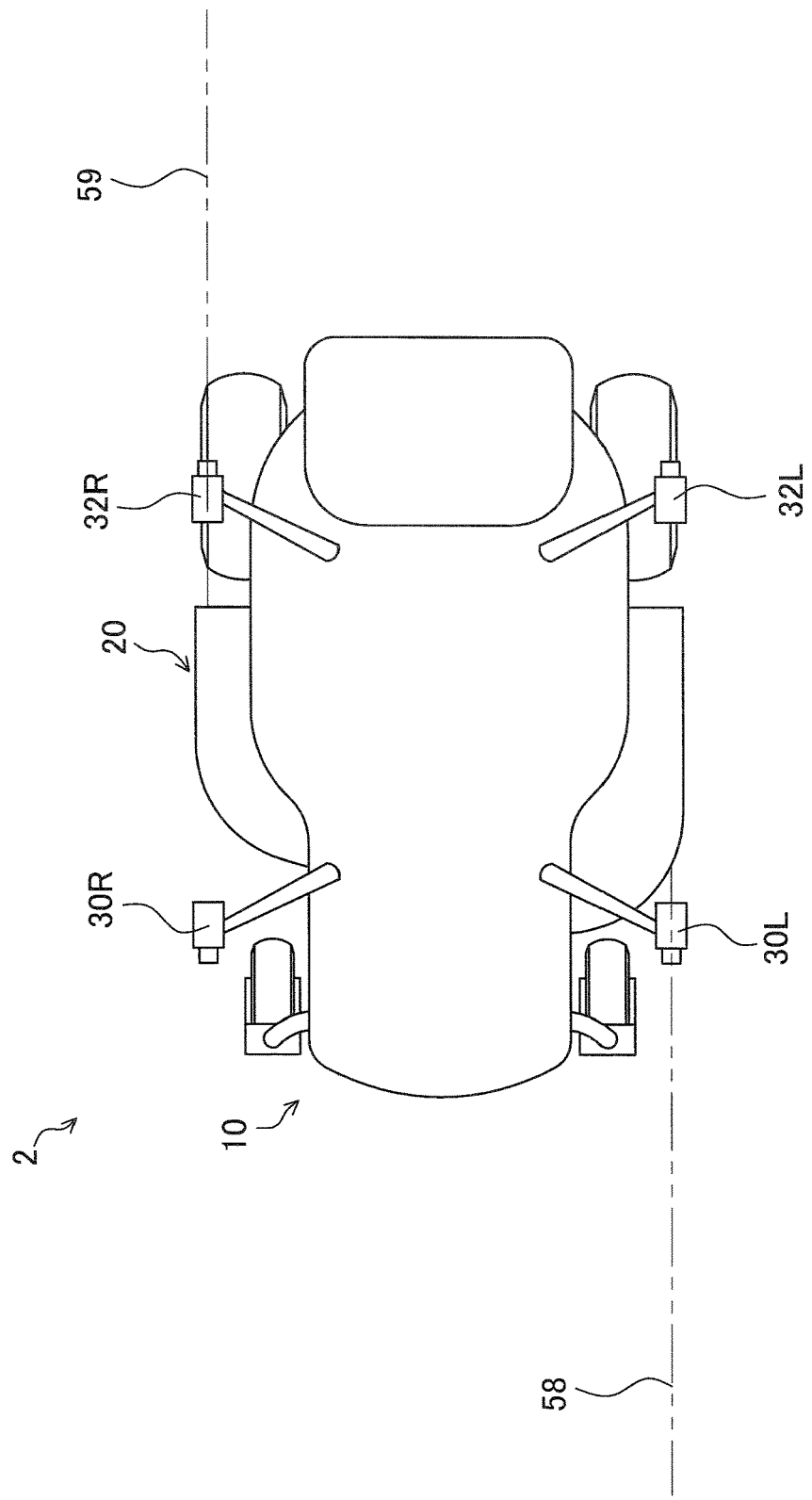
FIG. 11 is a schematic plane view illustrating an example of a work vehicle according to another embodiment.

It should be noted that the mowing vehicle 1 as the work vehicle is not restricted to the structure mentioned above. For example, as illustrated in FIG. 11, in addition to the right-and-left image-capturing devices 30R and 30L, the mowing vehicle 1 may also include right-and-left image-capturing devices 32 (32R, 32L) as second image-capturing devices capable of capturing the backward of the traveling machine 10. Herein, FIG. 11 is a schematic plane view illustrating a mowing vehicle 2 as an example of a work vehicle according to another embodiment. It should be noted that the mowing vehicle 2 has a structure similar to that of the mowing vehicle 1 except for the right-and-left image-capturing devices 32 (32R, 32L).

The image-capturing devices 32 (32R, 32L) are to capture boundary line of grass before and after mowing right after the grass mown by the mowing device 20 as the working machine. In such manners, when detecting the boundary line of grass before and after mowing based on the image captured by the image-capturing devices 30 (30R, 30L), it is possible to reduce arithmetic volume of the boundary-detecting unit C2. Furthermore, the boundary line can be detected more accurately.

More specifically, for example, when traveling along the route R1*b*, the boundary-detecting unit C2 detects a boundary line 58 of grass before and after mowing based on an image captured by the left image-capturing device 30L. On this occasion, the mowing vehicle 2 captures with the right image-capturing device 32R a boundary line 59 of grass before and after mowing right after the grass mown by the mowing device 20, at any point on the route R1*b*. As similar to the case of detecting boundary line, the boundary-detecting unit C2 carries out the filtering with the Gabor filter on the image captured by the right image-capturing device 32R. As similar to the case of detecting boundary line, the boundary-detecting unit C2 sets a plurality of inspection areas and a plurality of inspection unit areas with respect to the image filtered by the Gabor filter. Furthermore, an average of a sum of brightness of the inspection unit areas in each inspection area is calculated. Then, an average of a sum of the calculated averages is calculated. This average is stored in the memory unit M as a threshold in the next step.

Herein, the image captured by the right image-capturing device 32R is an image captured from a direction same as an image to be captured by the right image-capturing device 30R when traveling along the route R1*c* in the next step. In other words, the mowing vehicle 2 is configured to capture in advance the image when traveling along the route R1*c* in the next step (an image in which the boundary line 59 is captured), using the right image-capturing device 32R. This threshold in the next step stored in the memory unit M is used for detecting the boundary line by the boundary-detecting unit C2 when traveling along the route R1*c*. The boundary-detecting unit C2 uses the threshold in the next step, stored in the memory unit M when traveling along the route R1*b*, as a threshold of boundary points used when detecting the boundary line 59 of grass before and after mowing based on the image captured by the right image-capturing device 30R (when traveling along the route R1c in the next step). Therefore, when traveling along the route R1c in the next step, it is not necessary for the boundary-detecting unit C2 to calculate the threshold of the boundary points so that the arithmetic volume of the boundary-detecting unit C2 can be reduced. Furthermore, this threshold is calculated based on the image captured from the same direction so that the boundary-detecting unit C2 can detect the boundary points more accurately. Therefore, the boundary-detecting unit C2 can detect the boundary line 59 more accurately.

Preferably, the mowing vehicles 1 and 2 are configured to capture a boundary line of grass before and after mowing by the image-capturing devices. Herein, structures of the mowing vehicles 1 and 2 are not restricted to those including the image-capturing devices in both sides. For example, the mowing vehicle 1 may be configured to include one image-capturing device, which captures the ground in front of the traveling machine 10. The mowing vehicle 2 may be configured to include two image-capturing devices, which respectively capture the ground in front and in back of the traveling machine 10. In such manners, the number of the image-capturing devices can be reduced, which improves productivity of the mowing vehicles 1 and 2.

Furthermore, the route R where the mowing vehicles 1 or 2 travels autonomously is not restricted to the above. Any kinds of route are applicable as long as the mowing vehicles 1 or 2 can travel along a boundary line of grass before and after mowing consecutively formed by the mowing device 20. For example, the route R may be a spiral route having a predetermined interval between adjacent routes.

Furthermore, a combination of a traveling machine and working machine in the work vehicle according to an embodiment of the present invention should not be restricted to a combination of the traveling machine 10 and the mowing device 20 in the mowing vehicles 1 and 2. For example, the work vehicle according to an embodiment of the present invention may be provided with a rotary tilling-device as the working machine in the back of the traveling machine. A work vehicle having such a structure travels while tilling topsoil of a work field by the rotary tilling-device so that traces of tilling is formed consecutively. As similar to the mowing vehicles 1 and 2, the work vehicle having such a structure can travel autonomously along the boundary line by capturing, with an image-capturing device, boundary line before and after tilling by the rotary tilling-device and by detecting the boundary line with a boundary-detecting unit based on the captured image.

Furthermore, the work vehicle according to an embodiment of the present invention may be provided with a seedling-planting device as the working machine in the back of the traveling machine. A work vehicle having such a structure travels while planting seedlings in a work field by the seedling-planting device so that the seedlings are planted consecutively as traces of work. Herein, the seedlings are planted, forming rows. Similar to the mowing vehicles 1 and 2, the work vehicle having such a structure can travel autonomously along the seedlings (row of the seedlings) as the boundary line by capturing, with an image-capturing device, the seedlings (row of the seedlings) as the boundary line before and after planting by the seedling-planting device and by detecting the seedlings (row of the seedlings) with a boundary-detecting unit based on the captured image.

INDUSTRIAL APPLICABILITY

A work vehicle according to an embodiment of the present invention is not restricted to a combination of a traveling machine and mowing device or a combination of a traveling machine and rotary tilling-device. The work vehicle according to an embodiment of the present invention is configured to work while traveling and is applicable to any work vehicle provided with a working machine consecutively forming traces of work on a work field.

REFERENCE SIGNS LIST 1, 2 MOWING VEHICLE (WORK VEHICLE)
10 TRAVELING MACHINE
20 MOWING DEVICE
30 IMAGE-CAPTURING DEVICE (FIRST IMAGE-CAPTURING DEVICE)
32 IMAGE-CAPTURING DEVICE (SECOND IMAGE-CAPTURING DEVICE)
C CONTROLLING UNIT
C1 POSITION-DETECTING UNIT
C2 BOUNDARY-DETECTING UNIT
C3 FIRST TRAVELING-CONTROLLING UNIT (TRAVELING-CONTROLLING UNIT)
C4 SECOND TRAVELING-CONTROLLING UNIT
M MEMORY UNIT

The invention claimed is:

1. A work vehicle configured to work while traveling, provided with a traveling machine and a working machine, comprising:
 a first image-capturing device configured to capture peripheries of the traveling machine; and
 a controlling unit configured to control the traveling machine to travel autonomously along a boundary line showing traces of work consecutively formed by the working machine,
 wherein the controlling unit includes:
 a boundary-detecting unit configured to detect the boundary line by processing an image captured by the first image-capturing device, and
 a traveling-controlling unit configured to control traveling directions of the traveling machine so as to be along the boundary line detected by the boundary-detecting unit, and
 wherein the boundary-detecting unit is configured to:
 generate intensity distribution information regarding texture information in a predetermined direction by filtering with a Gabor filter on the image captured by the first image-capturing device,
 carry out statistical processing on the intensity distribution information per inspection area divided in plural in a vertical direction so as to detect boundary points, and
 detect the boundary line from the boundary points per the inspection area.

2. The work vehicle according to claim 1, wherein the predetermined direction is an upward direction or a downward direction.

3. The work vehicle according to claim 1, wherein the first image-capturing device is disposed in such a manner that the boundary line showing the traces of work is placed substantially at the center in the horizontal direction of the image to be captured.

4. The work vehicle according to claim 1, comprising first image-capturing devices provided corresponding to each of right-and-left edges of the working machine,
 wherein the controlling unit is configured to carry out processing on an image captured by one of the first image-capturing devices.

5. The work vehicle according to claim 1, further comprising: a memory unit and a second image-capturing device capable of capturing the traces of work right after the work of the working machine, wherein the controlling unit is configured to:
generate another intensity distribution information regarding texture information in a predetermined direction by filtering with the Gabor filter on an image captured by the second image-capturing device,
store in the memory unit processing results obtained by carrying out statistical processing on aforementioned another intensity distribution information per inspection area divided in plural in a vertical direction, and
use later the processing results stored in the memory unit when carrying out the statistical processing in which the image captured by the first image-capturing device is processed so as to detect the boundary line.

* * * * *